United States Patent

[11] 3,616,379

[72] Inventor David E. Harmer
 Midland, Mich.
[21] Appl. No. 696,983
[22] Filed Jan. 11, 1968
[45] Patented Oct. 26, 1971
[73] Assignee The Dow Chemical Company
 Midland, Mich.

[54] CHLOROBROMINATION OF BENZENE IN THE PRESENCE OF HIGH ENERGY RADIATION
 11 Claims, No Drawings

[52] U.S. Cl. .................................................. 204/163
[51] Int. Cl. .................................................. B01j 1/10
[50] Field of Search ........................................... 204/163 HE

[56] References Cited
OTHER REFERENCES

Harmer et al., Nuclear Eng., Chem. Eng. Prog. Symposium Series, Vol. 11 (1954) p. 253 [ TK 9001.N7]

Primary Examiner—Benjamin R. Padgett
Attorneys—Griswold and Burdick and C. E. Rehberg ABSTRACT: Chlorobromination of benzene to produce principally 1-chloro-2,3,4,5,6-pentabromocyclohexane is accomplished by a process comprising contacting chlorine, bromine and benzene in the presence of high energy radiation.

CHLOROBROMINATION OF BENZENE IN THE PRESENCE OF HIGH ENERGY RADIATION

BACKGROUND OF THE INVENTION

Chlorobromocyclohexanes have been produced by contacting chlorine gas, bromine and benzene in the presence of electric light bulbs. See Emschwiller and Sacouney, Bull. Chim. Soc., France, 16, 118 (1949). There are, however, problems encountered in the photocatalyzed production of chlorobromocyclohexanes. One of the most significant problems is the relatively shallow penetration of this type of radiation in the dense reaction media employed. This problem is enhanced further by the addition product coating the inside of the reaction vessel. As a result, violent agitation is necessary to make the reaction proceed at a reasonable rate. The chlorobromocyclohexane products of this reaction are difficult to purify, have small crystal size which leads to handling difficulty and have lower melting points than their purified counterparts.

SUMMARY OF THE INVENTION

It has now been found that benzene is chlorobrominated to a product which is principally 1-chloro-2,3-4,5,6-pentabromocyclohexane by a process comprising contacting benzene, chlorine and bromine in the presence of high energy radiation. While not necessary to the invention, it is preferred to contact the reactants in the presence of an inert solvent. By using this process, it is no longer necessary to violently agitate the reactants, reaction rates are essentially constant throughout the reaction period, the product needs little, if any, purification, crystal size is larger and a higher melting point than was previously obtainable for the crude product is achieved.

In order to practice the invention, benzene, chlorine and bromine are contacted in any convenient manner in the presence of high energy radiation. The product is then separated from the reaction product mixture by conventional methods. As was previously mentioned, the use of an inert solvent is preferred and said solvent can be precharged to the reaction vessel, added continuously during reaction, added incrementally as the reaction proceeds, or added continuously or incrementally for only a portion of the reaction time. Similarly, the benzene and the halogen reactants independently can be added in the same manner as was described for the solvent addition. It is preferred to add the reactants either incrementally or continuously throughout the reaction period or for a portion of the reaction period. Of course, a recycle of unreacted benzene, halogen reactants and solvent, or any one or two or more of them, can be employed so that either a batch or continuous process can be utilized.

The term "high energy radiation" as used herein denotes that type of radiation which will penetrate aluminum foil of 0.01 mm. thickness. Examples of high energy radiation suitable for this invention include electromagnetic energy (e.g. photons, gamma rays), high-velocity electrons (beta rays), or other corpuscular beams such as neutrons, protons, alpha-particles, or deuterons such as those obtained from nuclear reactors or accelerators like a Van de Graaff machine. Cobalt-60 and cessium-127 are particularly desirable sources of gamma rays.

The degree of high energy radiation necessary must be at least sufficient to form sites for free radical addition. Of course, the radiation need not be administered throughout the reaction period or even to all of the reaction vessel. The reaction time and radiation intensity are interrelated so that lower radiation intensities require longer reaction times than do the higher radiation intensities. The duration of the period during which the reactants are subjected to radiation may suitably vary from a fraction of a second to many hours depending on the intensity of the radiation. It is preferred to use a high energy radiation source of electromagnetic energy with an energy of between 0.1 and 10.0 mev. administered at radiation intensities varying from 1 kilorad per hour to 10 or 20 megarads per hour (most preferably from 20 kilorads per hour to 1 megarad per hour). Of course, a corpuscular beam of high energy radiation would have a much larger range of useful radiation intensity. The beam energy can vary from 0.1 mev. to around 20 mev. administered at radiation intensities between 1 kilorad per hour to 2000 megarads per second (the latter would be an instantaneous dose rate administered to an exposed portion of the total volume of the reaction system).

In order to produce 1-chloro-2,3,4,5,6-pentabromocyclohexane, the molar ratio of bromine to chlorine can vary widely. Better yields are found at ratios between 5:1 and 1:3. Of course, bromine chloride can be used in the chlorobromination of benzene. The molar ratio of bromine plus chlorine (or bromine chloride) to benzene can also vary widely, however, preferably it is between 6:1 to 1:1 and most preferably between 3:1 and 1:1.

The solvent, when used, is any solvent which is liquid and substantially inert under the reaction conditions. It is preferred to use a solvent in which chlorine is soluble, e.g. carbon tetrachloride, methylene chloride, chloroform, trichloroethane, hexane or petroleum ether. When used, the solvent is preferably precharged to the reaction vessel.

The temperature range is not critical to this invention and can be varied widely. Suitably, it is between $-50°$ and $100°$ C. and is preferably between $-10°$ and $40°$ C. The preferred pressure is atmospheric but subatmospheric and superatmospheric pressure can be employed.

The product is useful as a fire-retardant. It can be incorporated into plastics to increase their resistance to flame and heat. The product produced by this method, when used without further purification, is comparable to the material produced in the prior art process which has been specially purified.

DESCRIPTION OF THE SPECIFIC EMBODIMENTS

Following are specific examples of the practice of this invention.

The examples numbered 1, 2 and 3 were conducted in a two-liter kettle type batch reaction vessel constructed of glass and equipped with a paddle-type agitator, a condenser, a thermocouple well and inlet lines. Reaction temperature was controlled by means of a constant temperature bath with secondary cooling fluid recirculating through the jacket of the reaction vessel. Radiation intensities were determined by ASTM Method P-1671-59. Proper allowances were made for decay of radioactive source and calculated radiation attenuation within the reaction mixture. The method of addition of reagents to the reaction vessel was as follows: The methylene chloride was precharged to the reaction vessel before the start of each batch. Bromine was added either in a batch at the start of the reaction cycle, or incrementally in 25 ml. portions throughout the time of reaction. Benzene was either fed continuously during the reaction or as a batch prior to the beginning of it. Chlorine gas and continuous benzene feed were metered into the reaction by means of calibrated rotameters.

Upon completion of the reaction cycle, unreacted halogens in the mixture were neutralized with 10 percent sodium hydroxide solution. Following this the aqueous layer was decanted and the product slurry in its solvent was filtered on a fritted glass funnel. The filter cake thus attained was tray vacuum-dried at 70° C. for 4 hours. The product was evaluated by determining 3 melting points: the onset of melting, the temperature at which sufficient melting occurred to form a meniscus within the melting point tube, and the final melting point when all material became liquified.

Cobalt-60 was used as a radiation source and had an average energy of around 1.25 mev. In each case the source was located adjacent to the reaction system.

As used herein, $Br_2$ efficiency is defined as the portion of total bromine charged to the reaction vessel which is found in the chloropentabromocyclohexane product.

EXAMPLE 1

1224 Grams of bromine was either precharged or added shotwise to the reaction vessel. Chlorine was fed in at a rate of 22.2 grams per hour for the first hour and at a rate of 17.0 grams per hour thereafter. Benzene was fed at a rate of 41.9 ml. per hour as indicated below. 1224 ml. of $Ch_2Cl_2$ was precharged to the reaction vessel. The total run time was 13 hours, the reaction temperature was 25° C ± 3° and the radiation intensity was 126.5 kilorads per hour. Results are shown in table I below.

TABLE I

| | Run Number | | |
|---|---|---|---|
| | 1 | 2 | 3 |
| Bromine feed | Shotwise 25 ml. at 30 min. intervals | precharge | precharge |
| Benzene feed | last 12 hrs. | last 12 hrs. | precharge |
| Grams product | 828.7 | 607.6 | 194.8 |
| $Br_2$ efficiency | 53 | 38.7 | 12.4 |
| Melting points °C: | | | |
| Initial | 192 | 194 | 197 |
| Meniscus | 196 | 198 | 202 |
| Final | 198 | 201 | 204 |

EXAMPLE 2

When longer reaction times are employed for carrying out the chlorobromination process, much lowered intensity of radiation can be used. Examples are provided by the data of table II. The method of provided out the runs shown in table II is the same as that described in example 1.

1238 ml. of $CH_2Cl_2$ was precharged to the reaction vessel with 5 ml. of HOH. 50 ml. of $Br_2$ was precharged and thereafter 25 ml. was added every 78 minutes for a total of 393 ml. $Cl_2$ was added at a rate of 22 grams per hour for the first hour and thereafter at a rate of 6.58 grams per hour. The benzene was added at a rate of 16.2 ml. per hour for 12 hours starting 1 hour after the start of the run. The reaction temperature was 25° C. ± 3° and the total run time was 32 hours. The results are reported in table II below.

TABLE II

| | Run Number | |
|---|---|---|
| | 4 | 5 |
| Intensity, kilorads/hr. | 33.5 | 19.5 |
| Grams product | 993 | 820.7 |
| % $Br_2$ efficiency | 63.1 | 52.5 |
| Melting Points °C: | | |
| Initial | 191 | 193 |
| Meniscus | 196 | 196 |
| Final | 199 | 199 |

EXAMPLE 3

Using the same procedure and equipment as described in examples 1 and 2, 1224 grams of $Br_2$ was charged to the vessel. The benzene feed rate was 41.9 ml. per hour and the chlorine feed rate was 22.2 grams $Cl_2$ per hour for the first hour and 17.0 grams $Cl_2$ per hour thereafter. The reaction temperature was 25° C. ± 3° and the radiation intensity was 126.5 kilorads per hour. 1224 Ml. of $CH_2Cl_2$ was precharged and the results are reported below in table III.

TABLE III

| Run Number | Total run time, hours | Chlorine feed, hour | Bromine feed | Benzene feed | Grams product | Percent yield based on $Br_2$ | Melting points, °C. | | |
|---|---|---|---|---|---|---|---|---|---|
| | | | | | | | Init. | Men. | Fin. |
| 6 | 10 | 10 | Precharge | Last 9 hours | 548 | 35 | 193 | 196 | 199 |
| 7 | 10 | 10 | do | do | 509 | 32 | 194 | 197 | 200 |
| 8 | 10 | 10 | Shotwise 25 ml. at 30 min. int. | do | 644 | 41 | 190 | 195 | 198 |
| 9 | 13 | (1) | do | 9 hours 1 hour after start to 10 hours. | 605 | 39 | 191 | 194 | 198 |
| 10 | 13 | 13 | do | Last 12 hours | 860 | 55 | 192 | 194 | 197 |
| 11 | 13 | 13 | do | 9 hours 1 hour after start to 10 hours. | 727 | 46 | 190 | 192 | 196 |
| 12 | 13 | 13 | do | Last 12 hours | 828.7 | 53 | 192 | 196 | 198 |
| 13 | 13 | 13 | Precharge | do | 607.6 | 38.7 | 194 | 198 | 201 |
| 14 | 13 | 13 | do | Precharge | 194.8 | 12.4 | 197 | 202 | 204 |

[1] First 10 hours.

EXAMPLE 4

In this example a modification of the reaction system was made to allow the radiation exposure to take place in a side arm portion. The reactant mixture was continuously pumped through this irradiated side arm and back again into a stirred holding vessel.

The holding vessel for this system consisted of a glass container of approximately 2 liters capacity. It was continuously agitated during the run by means of a paddle-type stirrer. The reaction mixture was taken from the bottom of the vessel and recirculated by means of a polyethylene or glass centrifugal pump, the discharge of which was connected to a small side arm of approximately 225 ml. capacity. This side arm was irradiated by placing a group of 5 rods or cesium-137 in a circle around it. The pump and holding tank were not irradiated since a wall of lead shielding blocks was positioned between the side arm and the remainder of the system. Temperature control was achieved by means of a jacket through which cooling water flowed, surrounding the side arm reactor section. The vent for the system was connected to a scrubber to remove corrosive gases. Removal of condensable liquids and chlorine from the system was minimized by passing the off-gases through a condenser operating under refrigeration, prior to their entering the scrubber system.

Dosimetry for this arrangement was carried out using a separate glass vessel located within the same configuration of cesium source rods. The standard Fricke dosimeter system was employed (ASTM-1671-59).

At the beginning of the 15-hour run, the precharge of methylene chloride and bromine was added to the system. Chlorine was then fed to the system for a period of 1 hour in the presence of the radiation, but without benzene feed. The remaining reactants were then fed continuously during the next 14 hour period, after which time the run was terminated. Benzene was fed by means of a dual syringe pump, using a calibrated dropping funnel as an additional check on quantity fed to the reaction.

Chlorine was measured through a calibrated rotameter. Bromine was placed in a dropping funnel attached to the reactor prior to each run. It was added remotely in increments each hour throughout the run. This was a 15 hour run at a radiation intensity of 1.13 megarads per hour administered to the side arm of the reactor. The reaction temperature was 25° C. ± 3° and 7 ml. of HOH was added as a precharge The results of these runs are presented in table IV.

TABLE IV

| Run Number | | | | |
|---|---|---|---|---|
| | 15 | 16 | 17 | 18 |
| Precharge: | | | | |
| CH$_2$Cl$_2$, ml. | 1875 | 1875 | 1875 | 1875 |
| Br$_2$, grams | 277.6 | 202.7 | 355.6 | 355.6 |
| Total Br$_2$ feed grams | 1406.3 | 1556.3 | 1875 | 1875 |
| Total benzene feed | 506.3 | 506.3 | 675 | 675 |
| Total Cl$_2$ feed grams | 180 | 180 | 241.9 | 357.3 |
| Grams product | 1033.6 | 1073.1 | 1076.4 | 1485.5 |
| Yield based on Br$_2$ | | 53.6% | 44.5% | 61.4% |

| | | | | Melting Points, °C: |
|---|---|---|---|---|
| Initial | 190 | 192 | 193 | 190 |
| Meniscus | 193 | 197 | 196 | 192 |
| Final | 198 | 200 | 200 | 196 |

EXAMPLE 5

In general, lower reaction temperatures tend to result in increased yield and somewhat lower product melting points. For example, a run similar to the preceding runs was conducted at a temperature of 9° C. with the result that the initial, meniscus and final melting points were 184°, 188° and 197° C. respectively and the yield based on Br$_2$ was 81 percent.

I claim:

1. A process for making 1-chloro-2,3,4,5,6-pentabromocyclohexane comprising contacting chlorine, bromine and benzene in the presence of an amount of high energy radiation sufficient to form sites for free radical addition.

2. A process as defined in claim 1 wherein the reactants are contacted in the presence of a substantially inert solvent.

3. A process as defined in claim 1 wherein the bromine to chlorine molar ratio is between 5:1 and 1:3.

4. A process as defined in claim 1 wherein the molar ratio of bromine plus chlorine to benzine is between 6:1 and 1:1.

5. A process as defined in claim 1 wherein the bromine is added incrementally or continuously throughout the reaction period or a portion thereof.

6. A process as defined in claim 1 wherein the benzene, chlorine and bromine are independently added incrementally or continuously throughout the reaction period or a portion thereof.

7. A process as defined in claim 1 wherein the pressure is atmospheric.

8. A process as defined in claim 1 wherein the high energy radiation has an energy between 0.1 and 10.0 mev. administered at a radiation intensity between 1 kilorad and 20 megarads per hour.

9. A process as defined in claim 1 wherein the temperature is between −50° and 100° C.

10. A process as defined in claim 8 wherein the intensity is between 20 kilorads and 1 megarad per hour and the type of energy is gamma radiation.

11. A process as defined in claim 2 wherein the inert solvent is precharged to the reaction vessel and is methylene chloride.

* * * * *